April 22, 1952  J. G. LEE  2,594,042
BOUNDARY LAYER ENERGIZING MEANS FOR ANNULAR DIFFUSERS
Filed May 21, 1947  2 SHEETS—SHEET 1

Inventor
John G. Lee
by H. Hume Mathews
Attorney

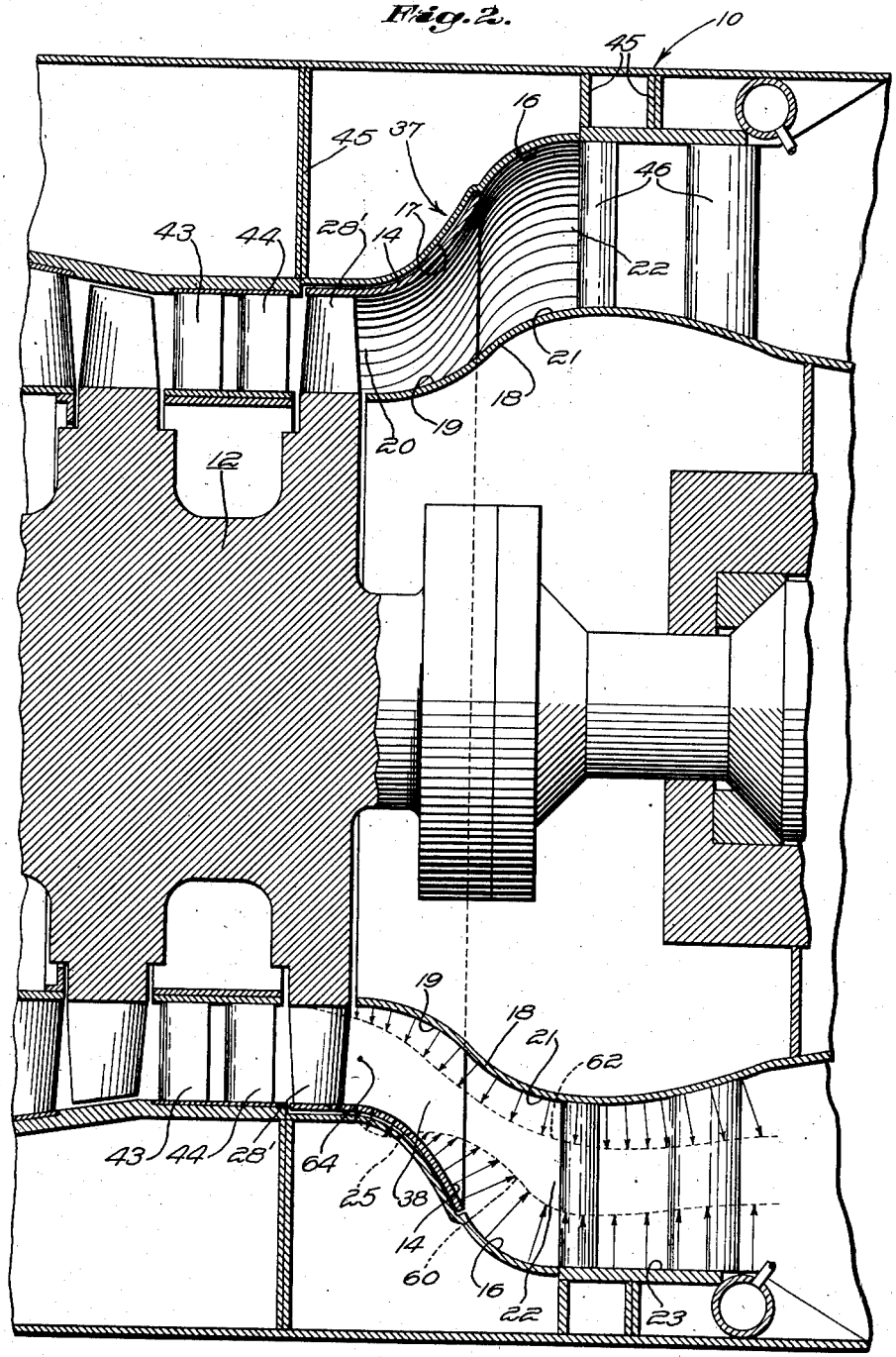

Patented Apr. 22, 1952

2,594,042

UNITED STATES PATENT OFFICE 2,594,042

BOUNDARY LAYER ENERGIZING MEANS FOR ANNULAR DIFFUSERS

John G. Lee, Farmington, Conn., assignor to United Aircraft Corporation, East Hartford, Conn., a corporation of Delaware Application May 21, 1947, Serial No. 749,619

4 Claims. (Cl. 230—132)

This invention relates to diffusers and has for its object the provision of an annular diffuser which includes as an element thereof a centrifugal boundary layer energizing means of the type disclosed and claimed in the Smith application Serial No. 709,049, filed November 9, 1946.

According to the present invention an annular expanding fluid passage is formed between inner and outer walls which are shaped and which function in a novel manner to provide a very efficient diffuser of relatively short length. The inner diffuser wall is maintained stationary and is shaped relative to the direction of flow of the airstream to prevent flow separation therefrom by maintaining a predetermined favorable pressure distribution in the boundary layer along the inner wall of the airstream.

Flow separation from the outer diffuser wall is prevented by rotating the wall thereby centrifugally energizing the boundary layer air.

The accompanying drawing illustrates by way of example a preferred embodiment of the invention which is particularly suitable for annular diffusers of the type used between the compressor and the turbine in axial flow turbo-jet engines. It is to be understood that the invention is not limited to this particular type of installation but is capable of wider use in accordance with principles which will be apparent from the following description and attached drawings of the preferred embodiment of the invention in which:

Fig. 2 is an enlarged sectional view of the annular diffuser of Fig. 1.

Figure 1:
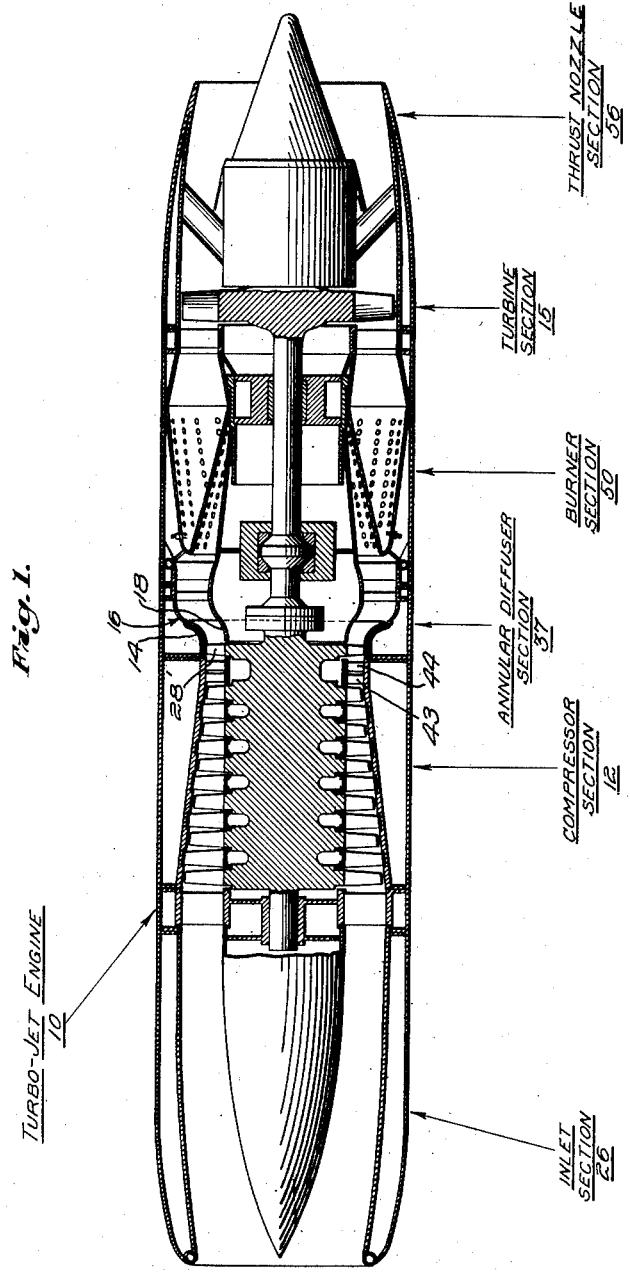
Fig. 1 is a longitudinal sectional view of a gas turbine power plant for aircraft having an annular diffuser located between the compressor and the combustion chamber of the power plant.

The power plant 10 of Fig. 1, except for the intermediate portion thereof which constitutes an annular diffuser connecting the compressor outlet with the combustion chamber inlet, may be of conventional construction. It may be, for example, a power plant of the type disclosed in Way Patent 2,405,723. The present invention, as best shown in Fig. 2, concerns only the annular diffuser section 37. Other parts of the engine such as the inlet 26, compressor 12, burner 50, turbine 15 and nozzle 56 are included in Fig. 1 merely to show the location and function of the annular diffuser in accordance with one application or use of the invention.

The airstream entering the inlet 20 of diffuser 37 has a relatively high velocity. It is the function of the diffuser to convert a large part of the velocity energy of this airstream to pressure energy, so that the air will be admitted to the burner chamber 50 at a relatively low velocity and a relatively high pressure. Diffuser 37 is constructed in a novel manner, in accordance with the teaching of the present invention, to accomplish this velocity to pressure conversion process efficiently in a short axial distance.

Referring primarily to the enlarged view of Fig. 2, an annular diffusing passage 38, which continuously expands or increases in cross-sectional area in the direction of fluid flow, is formed between a stationary inner wall 18 and an outer wall having a stationary portion 16 and a rotatable portion 14. Wall portion 14 may be rotated in various ways, some of which, for instance, are disclosed in the Smith application referred to above. As shown in Fig. 2 of the present application, this wall portion may be carried by and rotated with the final row of compressor blades 28', interposed between the stationary diffuser vanes 43, 44 and the entrance or inlet portion 20 of the annular diffuser 37. The stationary wall portions may be supported from the engine casing by partitions 45 and vanes 46. In order to provide a smooth uninterrupted boundary surface, stationary wall portion 16 is recessed at 17 and the rotating wall portion 14 is shaped to fit this recess, so that the inner surface of the outer wall is substantially continuous and of smooth contour in the direction of fluid flow.

The rotating portion of the outer wall is trumpet-shaped, having a convex inner surface bounding the outside of the fluid stream. This convex rotating surface merges into the concave inner surface of the stationary wall portion 16. Taken together, these rotating and stationary portions form a substantially continuous smooth-surfaced outer wall which diverges in the direction of fluid flow from a relatively small diameter at the inlet 20 to a relatively large diameter at the outlet 22.

Inner wall 18 comprises a concave portion 19 which merges smoothly into a convex portion 21 to form a continuous inner boundary for the fluid stream. The inner wall diverges at a slower rate than the outer wall from a relatively small diameter at the inlet 20 to a relatively large diameter at the outlet 22. Because of this differential increase in diameters, or radii of the walls, the fluid passage formed by the two walls continuously expands in cross-sectional area in the direction of fluid flow from inlet 20 to outlet 22. Furthermore, in the form of the invention shown in the drawings, the outer wall may diverge at a greater angle or to a greater extent than the inner wall, thus providing an additional increase in cross-sectional area of the annular passage in the direction of fluid flow. So long as the flow does not separate from the walls, this continuous area increase provides a continuous gradual conversion from velocity energy to pressure energy as the fluid stream passes through the diffuser. The annular expanding passage therefore converts or diffuses fluid which enters inlet 20 at a relatively high velocity and low pressure to a relatively low velocity and high pressure at the outlet 22.

In order to prevent flow separation from the outer wall the boundary layer fluid next to the outer wall is centrifugally energized by rotating the wall portion 14; in the embodiment of the invention shown in Fig. 2 such rotation is at the speed of the compressor. As fully explained in the Smith application, rotation of the boundary wall in this manner energizes the boundary layer fluid and increases the efficiency of the diffusing process while at the same time preventing separation of the flow from the outer wall portions 14, 16, even though the outer wall diverges at relatively large angles with respect to the direction of flow of the entering fluid.

Flow separation from the inner wall 18 is prevented or reduced by shaping its stream bounding surface in a predetermined manner with respect to the direction of fluid flow through the diffuser. For instance, as shown in Fig. 2, the entering fluid is initially deflected outwardly by the concave inner wall portion 19 and then deflected inwardly by the convex inner wall portion 21. This arrangement "spreads" the pressure rise along the inner wall, as shown schematically in the pressure diagram illustrated by the arrows at the bottom of Fig. 2, thereby tending to equalize the pressure rise along the inner wall and reducing the tendency of the fluid stream to break-away or separate from the wall.

Referring to the pressure diagram, the arrows represent the pressures (resulting both from diffusion and from deflection of this airstream by the walls) at various points along the inner and outer wall surfaces, relative to the pressure in the fluid stream at the point 64, at the central or middle point of the cross-sectional area at the inlet 20. Fluid entering the diffuser is turned outwardly by the concave inner wall portion 19 and this deflection of the airstream by the inner wall surface increases the fluid pressure in the boundary layer next to the concave wall surface 19 and thereby tends to prevent separation of the fluid flow therefrom. Increase of the fluid pressure in this manner along the concave surface 19, created by the deflection or angular acceleration of the fluid stream by the wall surface, is in addition to the increase in the static pressure of the fluid resulting from the diffusion process caused by the expansion in cross-sectional area of passage 38 in the direction of fluid flow. This last-named pressure increase, resulting from diffusion, occurs across the entire cross-sectional area of the passage and consequently is present at both the outer as well as the inner wall. But the pressure change in the boundary layer due to the deflection of the fluid stream tends to increase the fluid pressure at the surface of the concave inner wall portion 19 and to decrease the pressure at the surface of the convex outer wall portion 14. The pressure change caused by diffusion occurs in substantially the same degree at both the inner and outer wall surfaces, while the pressure change caused by deviation of the fluid stream affects the fluid pressures at the respective walls unequally.

The net result of the deviation fluid pressures, or the combined effect of the concave inner wall portion 19 and the convex outer wall portion 14, is to provide a favorable pressure distribution over the inner wall surface which reduces or eliminates flow separation therefrom, while at the same time producing an unfavorable pressure distribution over the outer wall surface at the location of the rotatable portion 14. However, the unfavorable pressure conditions so created at the outer wall are overcome or nullified by rotation of the wall portion 14. As explained in the Smith application referred to above, the boundary layer adjacent the outer wall is centrifugally energized by rotation of the wall so as to provide efficient diffusion with a wide angle of divergence and this may be done without flow separation even under the adverse pressure distribution conditions at the outer wall shown by the arrows in Fig. 2. The pressure diagram in Fig. 2 neglects the effect of rotation of wall portion 14.

As separation of flow is most likely to occur near the diffuser inlet the configuration and location of the inlet wall portions 14 and 19 are most important and the outlet wall portions 16 and 21 can be considerably varied in design to fit the requirements of different installations. In the embodiment of the drawings, the concave inner wall portion 19 is followed (in the direction of flow) by a convex inner wall portion 21 and the shape and location of these inner wall portions is such as to provide a gradual, continuously-increasing pressure rise along the inner wall surface from inlet 20 to outlet 22, as shown by the pressure curve 62. The outlet portion 16 of the outer wall is made concave and terminates in a straight wall section 23 of slightly less diameter than the outer casing of the engine. As shown by the pressure curve 60, a pressure reversal may occur at the point 25 on the outer wall but this point is located at the rotating portion 14 where the boundary layer air is centrifugally energized; therefore the diffusion process is not materially affected by such unfavorable pressure distribution.

If desired, the outlet diffuser wall portions 16 and 21 may be shaped and relatively located so that a constant annular cross-sectional area is maintained over the section bounded by these wall portions. With such an arrangement, the diffusing process would be confined to the annular inlet section, between the wall portions 14 and 19. Vanes of the character disclosed in Smith application Serial No. 709,049 may be provided on the inside rotating wall portion 14, particularly in installations where the boundary layer air at the entrance to the diffuser is relatively thick.

It is to be understood that the invention is not limited to the specific embodiment herein illustrated and described, but may be used in other ways without departure from its spirit as defined by the following claims.

I claim:

1. A diffuser construction comprising inner and outer annular walls which cooperate to form an annular fluid passage that expands in the direction of fluid flow, means for supporting said walls in fixed relation radially with respect to one another, one of said walls having a concave portion therein for diverting the fluid stream toward the other of said walls, and means including driving mechanism operatively connected to said other wall for rotating a portion of said other wall in radial alignment therewith.

2. In a diffuser construction, an annular inner wall having a concave outer surface, an annular outer wall coaxial with said inner wall and having a convex inner surface opposite said concave surface, means for supporting said walls in fixed relation radially with respect to one another, and means including a driving member operatively connected to said convex surface for rotating said convex wall surface about the axis of said walls.

3. In a diffuser construction concentric inner and outer walls forming between them an annular path for fluid, means for supporting said walls in predetermined radial relation such that said walls are concentric to each other, said walls diverging in the direction of flow such that the fluid path increases in cross-sectional area in the direction of flow, said inner wall having a concave surface for directing the flow radially outward, and said outer wall, radially opposite to said concave surface, being convex, and means for rotating a part of said outer wall about its axis comprising a driving member and an interconnecting member spanning the fluid path and connecting said outer wall and said driving member.

4. In a mechanism for preventing separation of flow from the confining surfaces of an annular diffuser construction having inner and outer walls, said mechanism comprising, means for supporting said walls in fixed relation radially with respect to one another, flow diverting means associated with and forming a fixed part of one of the diffuser walls for energizing the boundary layer fluid adjacent said wall including a concave wall portion, and centrifugal means in radial alignment with said flow diverting means for energizing the boundary layer fluid adjacent the other of said diffuser walls including a rotatable convex wall portion having a driving member operatively connected thereto.

JOHN G. LEE.

REFERENCES CITED

The following references are of record in the file of this patent:

UNITED STATES PATENTS

| Number | Name | Date |
|---|---|---|
| 1,614,091 | Van Toff | Jan. 11, 1927 |
| 2,405,723 | Way | Aug. 13, 1946 |
| 2,414,410 | Griffith | Jan. 14, 1947 |
| 2,427,136 | Hagen, et al. | Sept. 9, 1947 |